United States Patent
Denzler et al.

(10) Patent No.: US 11,069,906 B2
(45) Date of Patent: Jul. 20, 2021

(54) FUEL CELL MODULE AND METHOD OF OPERATING A FUEL CELL MODULE

(71) Applicant: Hexis AG, Winterthur (CH)

(72) Inventors: Roland Denzler, Weisslingen (CH); Andreas Mai, Constance (DE); Christoph Meier, Winterthur (CH)

(73) Assignee: HEXIS AG, Winterthur (CH)

( * ) Notice: Subject to any disclaimer, the term of this patent is extended or adjusted under 35 U.S.C. 154(b) by 21 days.

(21) Appl. No.: 14/959,452

(22) Filed: Dec. 4, 2015

(65) Prior Publication Data
US 2016/0181632 A1 Jun. 23, 2016

(30) Foreign Application Priority Data
Dec. 19, 2014 (EP) .................................. 14199227

(51) Int. Cl.
| | | |
|---|---|---|
| *H01M 8/04* | (2016.01) | |
| *H01M 8/24* | (2016.01) | |
| *H01M 2/38* | (2006.01) | |
| *H01M 2/40* | (2006.01) | |
| *H01M 8/04014* | (2016.01) | |
| *H01M 8/04082* | (2016.01) | |

(Continued)

(52) U.S. Cl.
CPC ... *H01M 8/04014* (2013.01); *H01M 8/04067* (2013.01); *H01M 8/04074* (2013.01); *H01M 8/04201* (2013.01); *H01M 8/24* (2013.01); *H01M 8/2475* (2013.01); *H01M 8/0625* (2013.01); *H01M 8/2425* (2013.01); *H01M 2008/1293* (2013.01)

(58) Field of Classification Search
CPC .................... H01M 8/0267; H01M 8/04007
See application file for complete search history.

(56) References Cited

U.S. PATENT DOCUMENTS 5,942,349 A * 8/1999 Badwal ............... H01M 8/0208
427/115
6,083,636 A * 7/2000 Hsu .......................... F02C 3/36
429/434

(Continued)

FOREIGN PATENT DOCUMENTS

| EP | 0580918 A1 | 2/1994 |
|---|---|---|
| EP | 2775557 A1 | 9/2014 |

(Continued)

OTHER PUBLICATIONS

Extended European Search Report dated May 18, 2016 in EP Patent Application No. 15193503.8.

(Continued)

*Primary Examiner* — Anca Eoff
*Assistant Examiner* — Julian Anthony
(74) *Attorney, Agent, or Firm* — Global IP Counselors, LLP

(57) ABSTRACT

A fuel cell module includes fuel cells and an air supply system. The fuel cells are arranged in a cell stack. The air supply system is configured to supply air into an air distribution space for operating or cooling the fuel cells. The fuel cells are stacked in an axial direction. The air supply system is configured such that cooling results due to the air supplied to the fuel cells not being of uniform strength in the axial direction. The air supply system is arranged completely radially outside the cell stack.

11 Claims, 2 Drawing Sheets

(51) Int. Cl.
*H01M 8/04007* (2016.01)
*H01M 8/2475* (2016.01)
*H01M 8/2425* (2016.01)
*H01M 8/0612* (2016.01)
*H01M 8/124* (2016.01)

(56) References Cited

U.S. PATENT DOCUMENTS

| | | | |
|---|---|---|---|
| 2003/0082422 A1* | 5/2003 | Koschany | H01M 8/04074 |
| | | | 429/434 |
| 2009/0239121 A1* | 9/2009 | Ono | H01M 8/0297 |
| | | | 429/405 |
| 2010/0015503 A1 | 1/2010 | Yaguchi et al. | |
| 2011/0039179 A1 | 2/2011 | Suh et al. | |
| 2012/0196202 A1 | 8/2012 | McInerney et al. | |
| 2013/0137008 A1* | 5/2013 | Kong | H01M 8/2485 |
| | | | 429/456 |

FOREIGN PATENT DOCUMENTS

| | | |
|---|---|---|
| JP | H08306381 A | 11/1996 |
| JP | H11-224683 A | 8/1999 |
| JP | 2002-260697 A | 9/2002 |
| JP | 2004-035310 A | 2/2004 |
| JP | 2004139960 A | 5/2004 |
| JP | 2005-005074 A | 1/2005 |
| JP | 2005-203255 A | 7/2005 |
| JP | 2005-340173 A | 12/2005 |
| JP | 2006-086018 A | 3/2006 |
| JP | 2008108722 A | 5/2008 |

OTHER PUBLICATIONS

Extended European Search Report dated Oct. 1, 2015 in European Patent Application No. 14199227.1, Filed Dec. 19, 2014.

* cited by examiner

FUEL CELL MODULE AND METHOD OF OPERATING A FUEL CELL MODULE

CROSS-REFERENCE TO RELATED APPLICATIONS

This application claims priority to EP Application No. 14199227.1, filed Dec. 19, 2014, the contents of which is hereby incorporated herein by reference.

BACKGROUND

Field of the Invention

The invention relates to a fuel cell module and to a method of operating a fuel cell module.

Background of the Invention

Fuel cells allow utilization of energy of a fuel by energy conversion. In this respect, both electrical energy, which is generated on the basis of electrochemical processes, and thermal energy, which arises in the form of hot exhaust gases, can be utilized. Gaseous flows of two reactants are conducted separately through the cells for this purpose. The first reactant in the form of environmental air, or just air, contains oxidizing components; the second reactant contains reducing components. A combustion gas (e.g. natural gas) which contains methane is in particular used as the second reactant; it is conducted through a reformer prior to the entry into the cells and is there converted into the reducing components of hydrogen and carbon monoxide, the so-called process gas. In the following, the second reactant is called a combustion gas or natural gas, which should also be understood as other suitable gases having reducing components.

Each fuel cell comprises two parts, namely a so-called PEN element (briefly called PEN) and a plate-shaped interconnector. The PEN element, which comprises at least three layers, namely P (cathode=positive electrode), E (electrolyte) and N (anode), is an electrochemically active element with which the electrochemical reactions can be carried out (at 700-900° C.); it has the form of a thin, for example circular, plate which comprises a layer-like solid electrolyte and two electrodes, P and N, applied by coating.

The interconnector separates the air from the process gas with a cell stack of a plurality of fuel cells. For this purpose, the interconnector has air interconnector passages for conducting the media at a so-called air side and process gas interconnector passages at a so-called gas side.

The supplied air does not only serve as a reaction reactant, but rather in particular also for cooling the fuel cells and thus for leading heat away from the fuel cells.

A fuel cell module typically has a plurality of fuel cells which are arranged in a so-called cell stack. The individual fuel cells are then stacked in an axial direction and are supplied in common with natural gas and air. Such a fuel cell module and a method of operating such a fuel cell module are described, for example, in EP 1 864 347 B1.

EP 0 580 918 A1 likewise describes such a fuel cell module. In this respect, air is supplied evenly to the cell stack over its entire height/axial direction so that a uniform cooling of the individual fuel cells is achieved.

SUMMARY

Studies of the applicant have shown that a temperature distribution in the axial direction of the cell stack has effects both on the efficiency of the fuel cell module and on a uniform aging of the individual fuel cells.

EP 2 775 557 A1 describes a fuel cell module in which the fuel cells are cooled more at the center of the cell stack than the further outwardly disposed fuel cells. This is achieved in that the air is first conducted through the cell stack before the distribution to the individual fuel cells and thus already comes into cooling contact with the fuel cells arranged at the center of the cell stack before reaching an air distribution space. On the one hand, these fuel cells are thus always cooled by the total supplied air and, on the other hand, the air is heated in this process so that only preheated air can be supplied to the further outwardly disposed fuel cells.

It is thus in particular the object of the invention to provide a fuel cell module and a method of operating a fuel cell module which allow a high efficiency and/or a uniform aging of the fuel cells. This object is satisfied in accordance with the invention by a fuel cell module having the features described herein and by a method of operating a fuel cell module having the features described herein.

The fuel cell module has fuel cells which are arranged in a cell stack and to which air for operating or cooling is supplied via an air distribution space by means of an air supply system. The air in particular does not only serve the cooling, but also supplies the oxygen for the electrochemical processes taking place in the fuel cells and thus for operating the fuel cells. The air flow which arises in this process can in this respect be called a primary air flow. The fuel cells are stacked in an axial direction. The air supply system is designed such that a cooling of the fuel cells results by the supplied air in the axial direction which is not of uniform strength.

In accordance with the invention, the fuel supply system is arranged completely radially outside the cell stack. It is thus achieved that the air does not already come into cooling contact with the fuel cells before entering into the air distribution space, but rather only after leaving the air distribution space. It is thus advantageously made possible that cool air, that is air not already heated by the fuel cells, can be led to all fuel cells of the cell stack. This allows a very precise and direct metering of the cooling of the individual fuel cells and thus a particularly uniform temperature distribution within the cell stack.

In this connection "radial" or radial direction should be understood as perpendicular to the named axial direction. The arrangement "outside" relates to an axis in the axial direction which extends through the centers of area of surfaces in the radial direction of the individual fuel cells. With plate-like fuel cells, the named axis thus extends through their centers and, with rectangular or square fuel cells, through the points of intersection of their diagonals.

The need for cooling by the supplied air of the individual fuel cells decisively depends on their position in the cell stack in the axial direction. Differences in particular result due to different heat dissipation due to radiation, convection and heat conduction to other components which are arranged in mechanical contact or in visual contact with the fuel cells. For example, the heat dissipation due to the named effects is higher with a fuel cell which is arranged at an end of the cell stack than with a fuel cell which is arranged at the center of the cell stack. The need for cooling of the individual fuel cells thus also differs. The cooling by the supplied air can in this respect be considered as an active cooling and the heat loss due to radiation, convection and heat conduction as a passive cooling.

These different needs for active cooling can be taken into account by the different level of cooling in the axial direction and very low temperature differences can be achieved within the cell stack in the axial direction of the cells. Fuel cells have their optimum efficiency and their optimum aging behavior in a specific temperature range of, for example, 800-850° C. The individual elements of the fuel cell module can be matched to one another due to the small temperature differences such that all the fuel cells of the cell stack are operated in the optimum temperature range. Each fuel cell and thus also the entire fuel cell module have a very high efficiency and a very good aging behavior. In addition, all the fuel cells and components connected thereto then expand almost by the same amount due to their almost equal temperatures and only very small strains arise due to different thermal expansions of the individual components.

The fuel cells are in particular designed as high-temperature fuel cells of the SOFC type ("solid oxide fuel cell"). In particular, environmental air which can also be filtered before the supply to the cell stack is used as the air. In the operating state of the fuel cell module, the axial direction is typically aligned perpendicular to the ground. When "up" and "down" are spoken of in the following, this relates to the described orientation of the fuel cell module in the operating state.

In an embodiment of the invention, the different level of cooling is achieved in that the cell stack has a total axial extent s_total in the axial direction and the air supply system is designed such that the air is only supplied into the air distribution space in a supply region which has an axial extent s_part in the axial direction which is smaller than the total axial extent s_total of the cell stack. The temperature distribution in the axial direction and thus the efficiency and the aging of the fuel cells can thus be positively influenced. The supplied air is then in particular distributed in the axial direction within the air distribution space so that all the fuel cells, that is also those arranged outside the supply region in the axial direction, are supplied with air. An air distribution is thus produced in the air distribution space which can be called a secondary air flow. The air supply system is in this respect in particular designed such that the cooling of the fuel cells is at an equal level in the total supply region in the axial direction or can at least be considered as at an equal level.

It is, however, also possible that air is supplied to the air distribution space over the total axial extent in a primary air flow and that the different levels of cooling in the axial direction is achieved by differently configured passage openings, for example passage openings for air having different diameters. Passage openings can thus be disposed at the end of the cell stack with a smaller diameter than passage openings at the center of the cell stack.

It is also possible that the air supply system is designed such that the air is only supplied in a supply region which has an axial extent s_part in the axial direction which is smaller than the total axial extent s_total of the cell stack and that in addition the passage openings within the supply region differ in the axial direction, that is, for example, passage openings have different diameters.

In addition, the passage openings can also differ in a direction transverse to the axial direction.

In an embodiment of the invention, the axial extent s_part of the supply region amounts to at most 80%, in particular at most 70%, and especially at most 50%, of the total axial extent s_total of the cell stack.

In an embodiment of the invention, the air distribution space has a first residual region having an axial extent s_rest1 in which no air is supplied and the first residual region is arranged at a first end of the cell stack. The first end of the cell stack can in this respect be arranged either at the top or at the bottom at the cell stack. It is thus achieved that no air is conducted to the cell stack for cooling in the primary air flow in a residual region at the upper or lower end of the cell stack. The air distribution space is, however, as described above, designed such that the required air for the electrochemical reaction nevertheless reaches all the fuel cells, that is also the fuel cells arranged in the residual region. This distribution of the air takes place in the air distribution space after the air has left the air supply system.

A particularly uniform temperature distribution can thus be achieved in the axial direction of the cell stack since more heat is led off at one end of the cell stack, in particular via radiation, convection and heat conduction, than at the further inwardly disposed regions of the cell stack. If cooling were also just as high at the end of the cell stack as in the further inwardly disposed regions, the temperature of the fuel cells arranged at the end would be much lower than that of the further inwardly disposed fuel cells. Particularly small temperature differences can thus be achieved within the cell stack in the axial direction of the cells.

In an embodiment of the invention, the air distribution space has a second residual region having an axial extent s_rest2 in which no air is supplied. The second residual region is in this respect arranged at a second end of the cell stack disposed opposite the first end. It is thus achieved that no air is conducted to the cell stack for cooling in a primary air flow in residual regions at the upper or lower ends of the cell stack. The increased radiation, convection and heat conduction can thus be taken into account at both ends of the cell stack and particularly small temperature differences are made possible in the axial direction of the cell stack.

It is in particular advantageous if the first and the second residual regions have different axial extents s_rest1, s_rest2 at the two ends of the cell stack. Different needs for active cooling at the two ends of the cell stack can be taken into account by the different axial extents. The different needs for active cooling can, for example, be due to differently configured insulation at the two ends or due to different adjacent components.

The first residual region and the second residual region, where present, in particular have axial extents s_rest1, s_rest2 which amount to at least 10%, in particular at least 15%, and especially at least 25%, of the total axial extent s_total of the cell stack.

In an embodiment of the invention, the fuel cells have an interconnector and a PEN element. Air interconnector passages for a throughflow with air are formed between the interconnector and the PEN element. The air flows over an inlet into the air interconnector passages. A total cross-sectional surface of the air interconnector passages at the inlet is not identical in all fuel cells of the cell stack. The larger the named total cross-sectional surface, the more air flows from the air distribution space into the air interconnector passages and the greater the active cooling of the fuel cells by the throughflowing air. The total cross-sectional surfaces can in particular be selected as larger in the regions with an increased need for active cooling than in regions with a lower need for active cooling. The total cross-sectional surfaces are thus in particular smaller in the region of the two ends of the cell stack than in a central region. A different level of cooling can thus be achieved by the supplied air. This can additionally be provided for the described supply of the air only in an axially limited supply region or also with a supply region extending over the total axial extent.

The total cross-sectional surfaces can in particular be formed by different heights of the air interconnector passages in the axial direction. The heights of the air interconnector passages can amount to between 0.7 and 2.0 mm, for example.

It is also possible that total cross-sectional surfaces of process gas interconnector passages differ.

In an embodiment of the invention, the air supply system is designed such that the air is conducted directly onto a component in a heat exchange with the cell stack, in particular onto an exhaust gas passage for dissipating exhaust gas of the fuel cells. The named component and in particular the exhaust gas passage are arranged at the cell stack. The named component can additionally satisfy another function or can also only be present for cooling the fuel cells. The further inwardly disposed fuel cells are then cooled via the named heat exchange, in particular via a radiation exchange. Studies have shown that this allows a particularly effective cooling. In this connection, "conduct air directly onto the component, in particular onto the exhaust gas passage" should in particular be understood such that the air is not preheated before the conducting onto the component and in particular onto the exhaust gas passage, but is rather conducted onto the component, and in particular onto the exhaust gas passage, at a temperature which is as low as possible. This allows a simple air guidance, which allows a simple and thus inexpensive air supply system.

The fuel cells in particular have a round outer contour transverse to the axial direction at which four exhaust gas passages, in particular exactly four exhaust gas passages, are arranged. The four exhaust gas passages are in particularly evenly distributed about the outer periphery of the fuel cells. A compact design of the fuel cell module and an even temperature development transversely to the axial direction can thus be achieved. After impacting the exhaust gas passages, the air flows outwardly and mainly transversely to the axial direction along them and is then supplied between the exhaust gas passages to the fuel cells for the electrochemical reaction.

In an embodiment of the invention, the cell stack is arranged in an insulation sleeve which has passage openings in the supply region. Since the fuel cells in particular have temperatures of above 750° C. in operation, an insulation toward the environment and thus an insulation sleeve are absolutely necessary. This insulation sleeve is in particular manufactured from a ceramic material into which passage openings can be introduced in a simple and inexpensive manner. An inexpensive air supply system is thus made possible by the described design. The passage openings in particular all have the same diameter. The diameters can, however, also differ in the axial direction and/or transversely to the axial direction. Specific points of the cell stack could thus be cooled more or less.

In an embodiment of the invention, at most one passage opening is associated with each exhaust gas passage at an axial position of the supply region. The insulation sleeve thus has either no passage opening or at most in particular as many passage openings as the number of exhaust gas passages at each axial position. Particularly few passage openings are thus necessary, which allows an inexpensive insulation sleeve.

In an embodiment of the invention, a supply element having a supply space is arranged at the insulation sleeve such that the passage openings are connected to the supply space. The supply element has an axial extent s_ver which is smaller than the total axial extent s_total of the cell stack. Only a small material effort is thus required for the supply element, which allows an inexpensive supply element.

The insulation sleeve in particular has a round outer contour and the supply element is arranged in ring form about the insulation sleeve. This allows a simple and inexpensive design of the fuel cell module and additionally a compact configuration.

The supply element in particular only has one air connection stub. This makes possible a particularly simple and inexpensive design of the fuel cell module.

The above-named object is also satisfied by a method of operating a fuel cell module, wherein the fuel cell module has fuel cells arranged in a cell stack and an air supply system for supplying air for cooling the fuel cells and the fuel cells are stacked in an axial direction and the fuel cells are cooled at uneven levels in the axial direction. In accordance with the invention, the fuel supply system is arranged completely radially outside the cell stack. The air is thus in particular supplied form radially outside to the air distribution space and then to the fuel cells.

Further advantages, features and details of the invention result with reference to the following description of embodiments and with reference to drawings in which elements which are the same or have the same function are provided with identical reference numerals.

BRIEF DESCRIPTION OF THE DRAWINGS

The invention will be explained in more detail hereinafter with reference to the drawings.

DETAILED DESCRIPTION OF THE EMBODIMENTS

Figure 1:
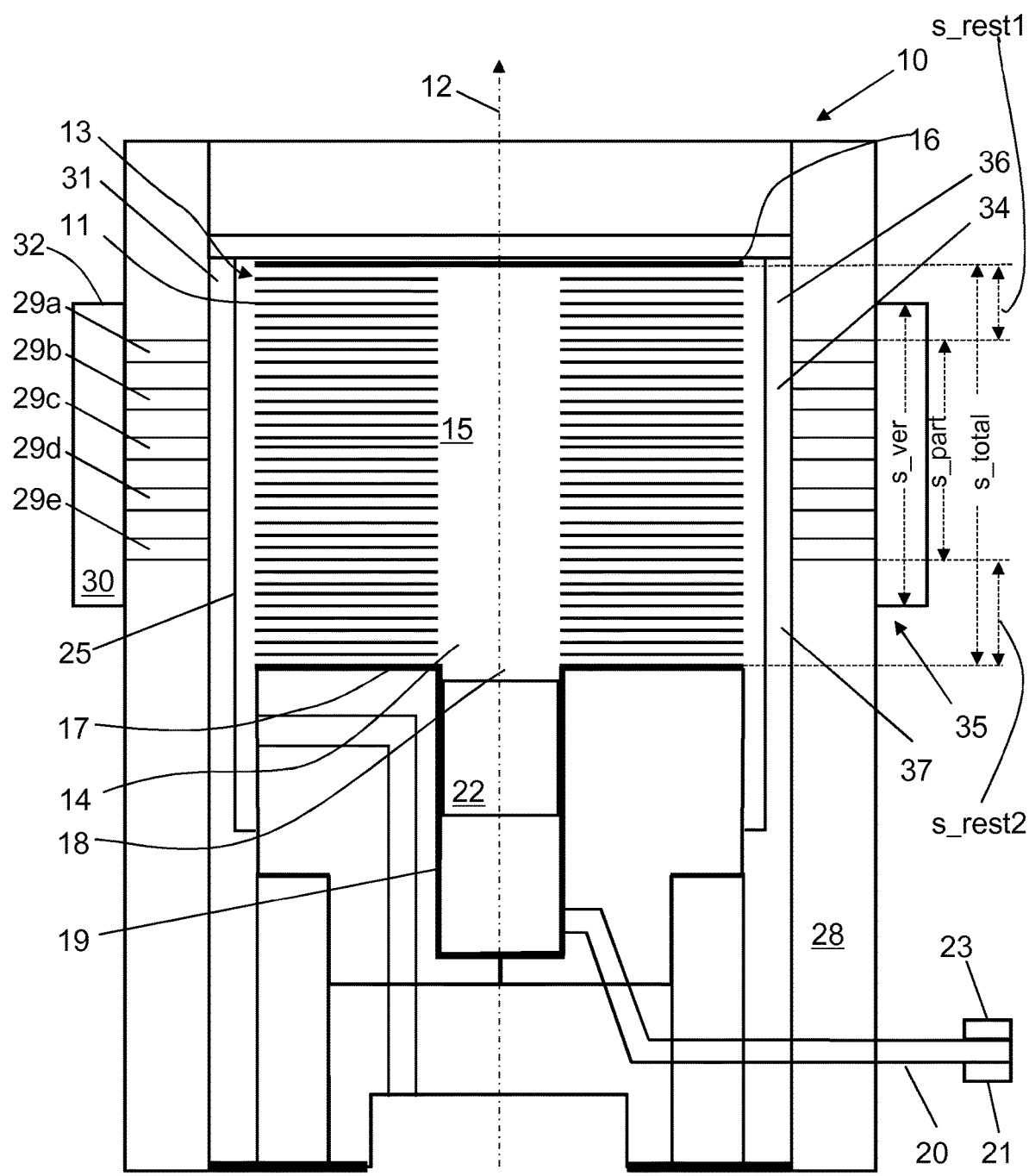
FIG. 1 is a fuel cell module in a longitudinal section.
Figure 2:
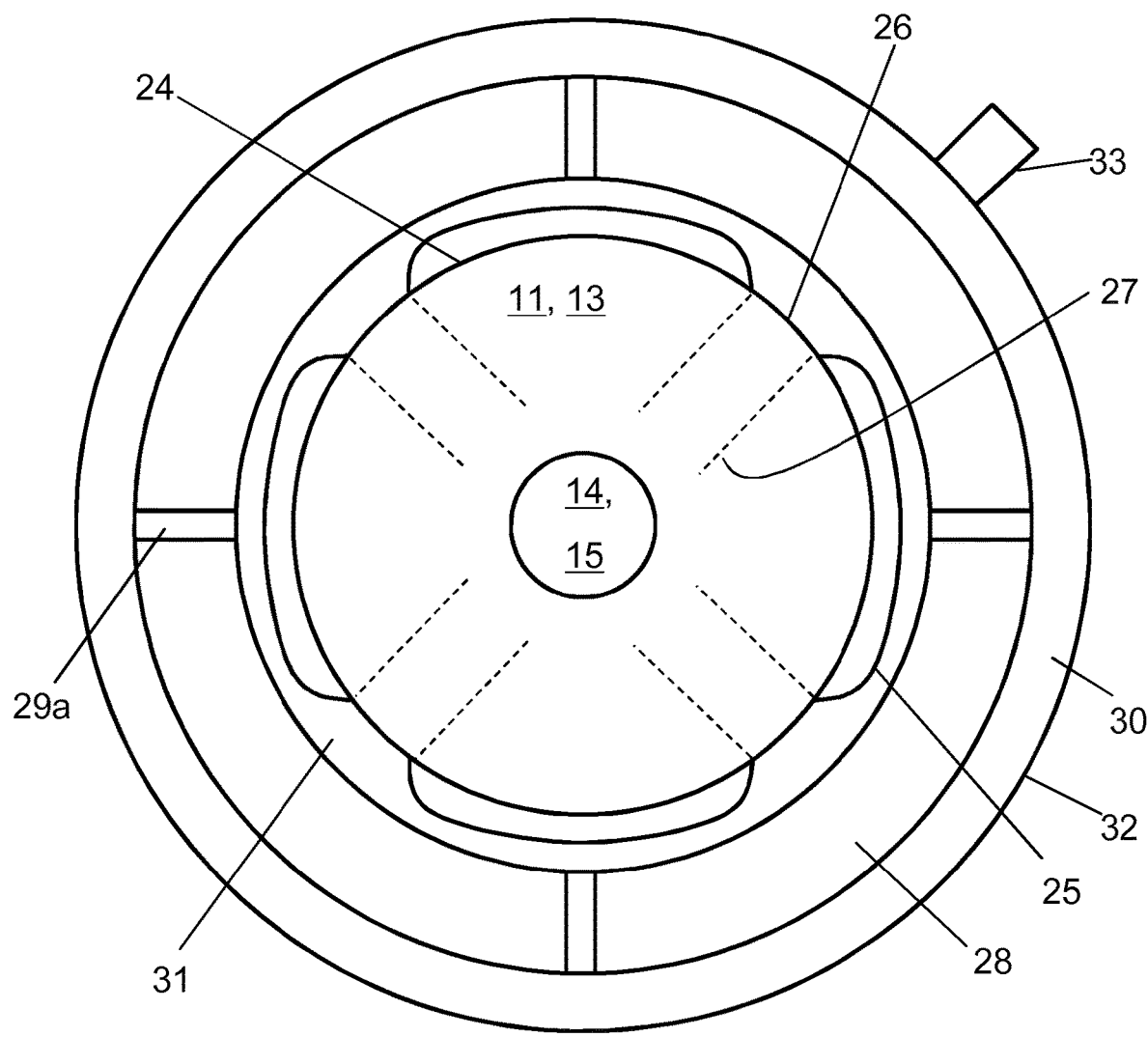
FIG. 2 is the fuel cell module in a cross-section.

In accordance with FIG. 1, a fuel cell module 10 has a plurality of fuel cells 11 which are stacked on one another in an axial direction 12 and thus form a cell stack 13. The individual fuel cells 11 have a plate-shaped basic shape with a circular cross-section (see FIG. 2) and thus a round outside contour transverse or perpendicular to the axial direction 12 so that the cell stack 13 has a cylindrical basic shape. The arrow facing in the axial direction 12 extends through the centers of the plate-like fuel cells 11. The fuel cells can, however, also have a different cross-section, such as elliptical, rectangular or square.

The fuel cells 11 have an inner opening 14 centrally in the axial direction 12 (see FIG. 2) so that a cylindrical distribution channel 15 is formed in the cell stack 13, from which distribution channel process gas can be supplied to each fuel cell 11 for the electrochemical reaction taking place in the fuel cells 11. The process gas can also be supplied in another manner, for example from outside.

The cell stack 13 is upwardly terminated by an upper accumulator 16. The upper accumulator 16 has a basic shape identical to the fuel cells 11, but no inner opening. The upper accumulator 16 forms the anode of the voltage generated by the cell stack 13. It has an electric connection which is not shown and via which an electric contact can be implemented.

The cell stack 13 is downwardly terminated by a lower accumulator 17 which forms the cathode of the voltage generated by the cell stack 13. The lower accumulator 17 likewise has a basic shape identical to the fuel cells 11 and has a circular inner opening 18. The lower accumulator 17 is welded to a hollow cylindrical sheath 19 which is connected to a gas supply line 20 at which a gas connection 21 is arranged. Natural gas can thus be supplied as combustion gas to the distribution channel 15 of the cell stack 13 via the gas connection 21, the gas supply line 20, the sheath 19 and the inner opening 18 of the lower accumulator 17. A reformer 22 is arranged in the sheath 19 and in it the methane gas present in the supplied natural gas is converted before the supply into the distribution channel 15 into hydrogen and carbon monoxide that is the so-called process gas. The accumulator 17, the sheath 19, the gas supply line 20 and the gas connection 21 are formed from an electrically conductive material in the form of steel such that the gas connection 21 is electrically conductively connected to the accumulator 17. An electric connection 23, not shown in any more detail, is arranged at the gas connection 21 and an electric connection to the lower accumulator 17 can be established via it.

The air required for the electrochemical reaction taking place in the fuel cells 11 is supplied to the cell stack 13 from the outside via an air distribution space 31. This will be explained with reference to FIG. 2. Four identical exhaust gas passages 25 are arranged distributed evenly at a round outside contour 24 of the cell stack 13 and thus of the fuel cells 11. Gaps 26 via which air can be supplied to the fuel cells 11 are produced between the exhaust gas passages 25. The fuel cells 11 have air guide elements 27 which extend from the gaps 26 in the direction of the distribution channel 15. Air interconnector passages 40 are formed with the air guide elements 27 (see FIG. 3). Air can thus flow, starting from the gaps 26, via the air guide elements 27 in the direction of the distribution passage 15 and outwardly again from there, with the electrochemical reaction with the hydrogen and with the carbon monoxide being able to take place. The exhaust gases of the electrochemical reaction and still non-reacted component, move into the exhaust gas passages 25 in which a so-called afterburning, that is an oxidation of the non-reacted hydrogen and of the carbon monoxide, also takes place. The exhaust gas is led off in a manner not shown in any more detail via the exhaust gas passages 25.

A hollow-cylindrical insulation sleeve 28 is arranged about the cell stack 13. The insulation sleeve 28 is formed from a ceramic material and has passage openings 29a which lead from the outside to the inside, with four passage openings 29a being arranged in the sectional plane of FIG. 2. Air can be supplied via the passage openings 29a from an outwardly formed supply space 30 into the air distribution space 31 formed between the cell stack 13 and the insulation sleeve 28. The passage openings 29a are in this respect arranged such that they conduct the air directly onto the exhaust gas passages 25. The supply of the air to the air distribution space takes place in a so-called primary air flow. The air then mainly flows in the peripheral direction along the exhaust gas passages 25 to the above-described gaps 26 in order then to flow as described in the direction of the distribution passage 15. The supplied air thus cools the exhaust gas passages 25 which then cool the cell stack 13 via radiation exchange. The air also flows partly in the axial direction in order thus also to arrive at the fuel cells 11 at whose axial position a passage opening is not directly arranged. Since a pressure loss on the flowing into the fuel cells 11 is comparatively large, air is distributed in the axial direction of the distribution space 31 so that all the fuel cells 11 are equally supplied with air. The distribution of the air within the air distribution space 31 is called a secondary air flow in this respect.

The supply space 30 is outwardly bounded by a supply element 32. The supply element 32 is arranged in circular form about the insulation sleeve 28. Air is only supplied to the supply space 30 via an air connection stub 33. It is in this respect the air required for the operation and the cooling. So much air is supplied via the air connection stub 33 that a so-to-say constant pressure is formed in the supply space 30.

As shown in FIG. 1, the supply element 32 has an axial extent s_ver in the axial direction 12 which is smaller than a total axial extent s_total of the cell stack 13. The axial extent s_total of the cell stack 13 is in this respect understood as the spacing in the axial direction 12 between an upper side of the lower accumulator 17 and a lower side of the upper accumulator 16.

Air is only supplied to the air distribution space 31 in a supply region 34 which has an axial extent s_part in the axial direction 12 which is smaller than the total axial extent s_total of the cell stack 13 and also of the axial extent s_ver of the supply element 32. For this purpose, the insulation sleeve 28 has a respective four passage openings 29a, 29b, 29c, 29d, 29e which are distributed in an axial direction 12 over the axial extent s_part of the supply region 34 and which are arranged in the same manner as the passage openings 29a shown in FIG. 2. The passage openings 29a, 29b, 29c, 29d, 29e are thus arranged at a total of five levels perpendicular to the axial direction 12. It additionally results that exactly one passage opening 29a, 29b, 29c, 29d, 29e is associated with each exhaust gas passage 25 at an axial position of the supply region 34. In this respect, the axial extent s_part of the supply region 34 is to be understood as the spacing in the axial direction 12 between a lower edge of the bottommost passage openings 29e and an upper edge of the topmost passage openings 29a.

The supply element 32, the passage openings 29a, 29b, 29c, 29d, 29e and the air distribution space 31 thus form an air supply system 35. The air supply system 35 is therefore arranged completely radially outside the cell stack 13. A cooling of the cell stack 13 and thus of the fuel cells of an uneven degree results in the axial direction 12 due to the described design of the supply region 34.

The passage openings 29a, 29b, 29c, 29d, 29e all have an identical diameter. It is, however, also possible that the passage openings 29a, 29b, 29c, 29d, 29e have different diameters in the different planes or also within one plane.

In the fuel cell module 10 shown in FIG. 1, the axial extent s_part of the supply region 34 amounts to approximately 55% of the total axial extent s_total of the cell stack 13.

However, it can also amount to at most 80%, in particular at most 70%, or at most 50%, of the total axial extent s_total of the cell stack 13.

The supply region 34 is arranged in the axial direction 12 such that a first residual region 36 having an axial extent s_rest1 and at which no air is supplied is formed in the region of the upper accumulator 16 which forms a first end of the cell stack 13. The axial extent s_rest1 amounts to approximately 20% of the total axial extent s_total of the cell stack 13.

The supply region 34 is additionally arranged in the axial direction 12 such that a second residual region 37 having an axial extent s_rest2 and at which no air is supplied is formed in the region of the lower accumulator 17 which forms a second end of the cell stack 13. The axial extent s_rest2 amounts to approximately 26% of the total axial extent s_total of the cell stack 13 and is thus larger than the axial extent s_rest1 of the first residual region. However, it is also possible that s_rest1 is larger than s_rest2.

The first residual region 36 and the second residual region 37 have axial extents s_rest1, s_rest2 which in particular amount to at least 10%, in particular at least 15%, and especially at least 25%, of the total axial extent s_total of the cell stack 13.

Figure 3:
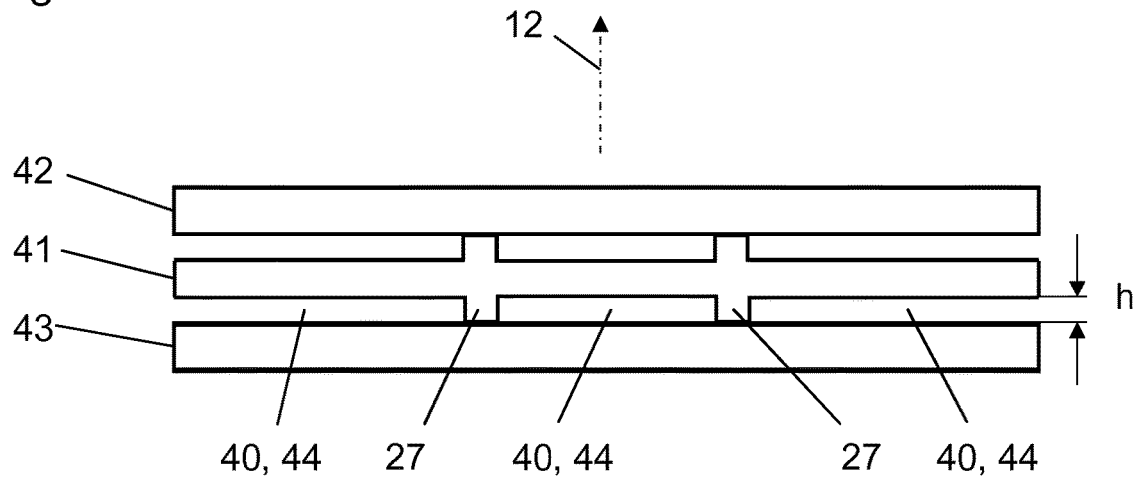
FIG. 3 is a detail of a cell stack in a side view in a very simplified representation.

A side view of a detail of the cell stack 13 is show in a side view in FIG. 3. An interconnector 41 is arranged in the axial direction 12 between two PEN elements 42, 43. The interconnector 41 likewise has a plate-like basic shape and has at its lower side two air guide elements 27 which are rectangular in cross-section and which are arranged next to one another transversely to the axial direction 12. Together with the downwardly adjacent PEN module 43, air interconnector passages 40 are thereby respectively formed at both sides of the air guide elements 27 and have a height h in the axial direction which results from the axial extent of the air guide elements 27. The supplied air flows over inlets 44 into the air interconnector passages 40. The interconnectors 41 and in particular the height of the air interconnector passages 40 of the individual fuel cells 11 can in this respect be always the same or different. If the interconnectors 41 of all fuel cells 11 of the cell stack are the same, a total cross-sectional surface of the air interconnector passages 40 of all fuel cells 11 of the cell stack 13 is also identical. If the interconnectors 41 in particular differ in the height h, the total cross-sectional surface of the air interconnector passages 40 of all fuel cells 11 of the cell stack 13 is not identical.

The invention claimed is:

1. A fuel cell module comprising:
fuel cells arranged in a cell stack; and
an air supply system configured to supply air into an air distribution space for operating or cooling the fuel cells,
the fuel cells being stacked in an axial direction,
the air supply system being configured to supply air radially from outside of the cell stack to the air distribution space in a primary air flow via a plurality of differently configured passage openings, the plurality of differently configured passage openings configured such that an amount of the air supplied radially from the air supply system in the primary air flow at a respective axial position of each of the plurality of differently configured passage openings is non-uniform over a total axial extent of the cell stack in the axial direction, and
the air distribution space and the plurality of differently configured passage openings being arranged completely radially outside the cell stack.

2. The fuel cell module in accordance with claim 1, wherein
the fuel cells have an interconnector and a PEN element, and air interconnector passages disposed between the interconnector and the PEN element for a throughflow of air, and the interconnector passages having total cross-sectional surfaces at inlets that are not identical for each fuel cell in the fuel cells of the fuel stack.

3. The fuel cell module in accordance with claim 1, wherein
the air supply system is configured such that the air is conducted directly onto a component in heat exchange with the cell stack for dissipating exhaust gas of the fuel cells.

4. The fuel cell module in accordance with claim 3, wherein
each fuel cell of the fuel cells has a round outer contour transverse to the axial direction and four exhaust gas passages arranged at the outer contour.

5. The fuel cell module in accordance with claim 4, wherein
at most one passage opening is associated with each exhaust gas passage of the four exhaust gas passages at an axial position of the supply region.

6. The fuel cell module in accordance with claim 1, wherein
the cell stack is arranged in an insulation sleeve having passage openings in the supply region.

7. The fuel cell module in accordance with claim 6, wherein
a supply element having a supply space is arranged at the insulation sleeve such that the passage openings are connected to the supply space and the supply element has an axial extent that is smaller than the total axial extent of the cell stack.

8. The fuel cell module in accordance with claim 7, wherein
the insulation sleeve has a round outer contour and the supply element is arranged in a ring shape about the insulation sleeve.

9. The fuel cell module in accordance with claim 7, wherein
the supply element has only one air connection stub.

10. The fuel cell module in accordance with claim 1, wherein
the air supply system is configured such that the air is conducted directly onto an exhaust gas passage in heat exchange with the cell stack for dissipating exhaust gas of the fuel cells.

11. A method of operating a fuel cell module comprising:
arranging fuel cells in a cell stack; and
supplying air into an air distribution space for operating or cooling the fuel cells using an air supply system,
the fuel cells being stacked in an axial direction,
the supplying air including cooling the fuel cells by different amounts in the axial direction by supplying air radially from outside of the cell stack in a primary air flow via a plurality of differently configured passage openings, the plurality of differently configured passage openings configured such that an amount of the air supplied radially from the air supply system in the primary air flow at a respective axial position of each of the plurality of differently configured passage openings is non-uniform over a total axial extent of the cell stack in the axial direction, and
the air distribution space and the plurality of differently configured passage openings being arranged completely radially outside the cell stack.

* * * * *